(12) United States Patent
Gomez Travesset et al.

(10) Patent No.: US 11,485,161 B2
(45) Date of Patent: Nov. 1, 2022

(54) USING DISCHARGED ENERGY (71) Applicant: HEWLETT-PACKARD DEVELOPMENT COMPANY, L.P., Spring, TX (US)

(72) Inventors: Xavier Gomez Travesset, San Cugat del Valles (ES); Elisenda Tapias, Cami de Can Graells (ES); Santiago De Pedro, San Cugat del Valles (ES); Ricardo Oltra Ramirez, Cami de Can Graells (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 103 days.

(21) Appl. No.: 16/621,546

(22) PCT Filed: Jul. 31, 2017

(86) PCT No.: PCT/US2017/044715
§ 371 (c)(1),
(2) Date: Dec. 11, 2019

(87) PCT Pub. No.: WO2019/027427
PCT Pub. Date: Feb. 7, 2019

(65) Prior Publication Data
US 2021/0276353 A1 Sep. 9, 2021

(51) Int. Cl.
*B41J 29/393* (2006.01)
*H02J 7/00* (2006.01)
*H02N 99/00* (2006.01)

(52) U.S. Cl.
CPC .......... *B41J 29/393* (2013.01); *H02J 7/0048* (2020.01); *H02N 99/00* (2013.01)

(58) Field of Classification Search
CPC ...... B41J 19/20; B41J 29/393; H04N 1/00896
See application file for complete search history.

(56) References Cited

U.S. PATENT DOCUMENTS

| | | | |
|---|---|---|---|
| 6,047,380 A | 4/2000 | Nolan et al. | |
| 6,469,885 B1 | 10/2002 | Mohler | |
| 6,865,049 B1 | 3/2005 | Codilian et al. | |
| 8,123,322 B1* | 2/2012 | Paul | B41J 19/20 |
| | | | 347/19 |
| 8,708,438 B2 | 4/2014 | Zhao et al. | |
| 9,285,850 B2 | 5/2016 | Yokoyama et al. | |

(Continued)

FOREIGN PATENT DOCUMENTS

| | | |
|---|---|---|
| CN | 204095139 | 1/2015 |
| CN | 206141340 | 5/2017 |

(Continued)

OTHER PUBLICATIONS

Brother Industries, Ltd. Low Energy Standby. Brother Earth. http://www.brotherearth.com/en/story/standby.html, printed May 31, 2017, 6 pages.

*Primary Examiner* — Lam S Nguyen
(74) *Attorney, Agent, or Firm* — HP Inc. Patent Department (57) ABSTRACT

A printer is described comprising a movable functional element, a chargeable energy-storing device and a charger to charge the chargeable energy-storing device using energy discharged from the movable functional element.

15 Claims, 6 Drawing Sheets

(56) References Cited

U.S. PATENT DOCUMENTS

| | | |
|---|---|---|
| 9,509,219 B2 | 11/2016 | Inukai et al. |
| 9,562,519 B1 | 2/2017 | Gardner et al. |
| 2007/0052242 A1 | 3/2007 | Mascarin |
| 2011/0248568 A1 | 10/2011 | Morgan et al. |
| 2013/0033532 A1 | 2/2013 | Zhao et al. |
| 2015/0212560 A1* | 7/2015 | Ueda ................ H04N 1/00896 358/1.13 |
| 2016/0013682 A1 | 1/2016 | Ostendorf et al. |

FOREIGN PATENT DOCUMENTS

| | | |
|---|---|---|
| JP | 2004009539 | 1/2004 |
| WO | WO-2012056032 A1 | 5/2012 |
| WO | WO-2015049916 A1 | 4/2015 |
| WO | WO-2016007357 A1 | 1/2016 |
| WO | WO-2016064408 | 4/2016 |

* cited by examiner

USING DISCHARGED ENERGY

BACKGROUND

A printer may use electrical energy for operation during which printing may be performed. Some printing systems may use an inkjet for transferring color to a print. Some printing systems may use electrostatic forces for transferring color, for example, by a dry toner powder or a liquid toner. Some printing systems may comprise a 3D printer for printing on a bed of build material.

Both, inkjet printers and printers using electrostatic forces may use movable functional elements such as carriages for transporting a printing fluid or rollers.

BRIEF DESCRIPTION

Examples will now be described, by way of non-limiting example only, with reference to the accompanying drawings, in which.

DETAILED DESCRIPTION

Some examples and parts of the description below make reference generally to inkjet printing systems. Such printing systems may use a printhead to transfer drops of ink to a media. The printhead may be moved by a carriage which drives the printhead from one position to another. Such a movement may comprise time intervals of accelerating the carriage and time intervals of decelerating the carriage.

Although referring to inkjet printing systems using a carriage, examples are not limited hereto. Other printing systems may use other functional components that are moved, accelerated and/or decelerated for printing, for example, a roller/cylinder such as a roller that are contacted with a dry toner powder. Such a movable functional element may also be an element being unused for the printing process itself, for example, a scanner head, a valve to depressurize a volume, a ventilation module comprising a fan blade, a motor/actuator and/or a circuitry to move the fan blade or the like. Other printing systems may comprise a 3D printer for printing on a bed of build material and may comprise respective moveable functional elements such as depositing elements and/or energy sources for emitting an energy for curing material, e.g., to be hardened.

According to an example, a printer comprises a movable functional element, a chargeable energy-storing device and a charger to charge the chargeable energy-storing device using energy discharged from the movable functional element. By using energy discharged from the movable functional element charging the chargeable energy-storing device may be performed with a low amount of external power or even without external power.

According to an example, the kinetic energy of the movable functional element may be used by the charger to charge the chargeable energy-storing device. The printer may perform energy recuperation of the kinetic energy of the movable functional element so as to charge the chargeable energy-storing device. This enables the printer to use energy that is otherwise wasted, e.g., by generating heat when decelerating the movable functional element. Furthermore, this enables the external power supply to be constructed according to energy which is directly used while avoiding additional resources reserved for charging the chargeable energy-storing device with external power.

According to an example, an actuator which is used to accelerate and/or decelerate the movable functional element comprises or is a motor having a counter electromotive force or back electromotive force (CEMF/BEMF). The actuator may convert a movement of the movable functional element to electrical energy used to charge the chargeable energy-storing device when decelerating the movable functional element.

According to an example, the printer comprises a power interface connectable to a physical external power supply. Such a power interface may comprise a transformer, an AC/DC-converter, an AC/AC-converter and/or an DC/DC converter for providing an electrical power level and/or frequency to the powered components. The printer may temporarily operate in a stand-by mode or a sleep mode. The printer may operate independently from power of the external power supply during the stand-by mode using electrical energy stored in the chargeable energy-storing device. This may allow for a low or even zero power consumption of external power.

According to an example, the printer may comprise a watchdog component for evaluating a level of charge of the chargeable energy-storing device and to output a signal wherein the level of charge is equal or below a threshold value. A watchdog component may include hardware components that allow for monitoring and/or comparing variables within an apparatus. For example, physical variables such as charging levels or voltage levels may be monitored. According to an example, a watchdog may comprise a controller or processor implementing machine-readable instructions for comparing the physical variable to a threshold level. The processor may be connected to a sensor for detecting the physical variable and for providing a sensor signal to the processor. The printer may use the external power supply responsive to the signal. Thus, when the level of charge of the chargeable energy-storing device is low, external power may be used so as to ensure safe operation of the printer.

According to an example, the printer comprises a detector for detecting an entry of the printer into the sleep mode and for switching the power supply from the external power supply to the chargeable energy-storing device responsive to the entry.

According to an example, the printer comprises an external power supply and an actuator to move the movable functional element. The actuator may be connected to the external power supply. The charger may comprise a charging device connected to the actuator for receiving the energy discharged from the movable functional element, i.e., electrical energy which is obtained from the energy discharged from the movable functional element which may include an energy conversion. The printer may comprise a decider for evaluating a voltage level of the energy discharged from the movable functional element. The printer may charge the chargeable energy-storing device when the voltage level is greater than a voltage threshold level. Thus, charging of the chargeable energy-storing device may be performed in suitable situations.

According to an example, the voltage threshold level is equal to a voltage level used to drive the actuator. This may allow preventing external energy or power to be used for charging the chargeable energy-storing device, when the voltage level generated by converting the energy discharged from the movable element is higher than the external power for driving the actuator.

According to an example, the printer may comprise a controller for determining a dissipation of energy out of the printer and for controlling the charger to use the dissipating energy for charging the chargeable energy-storing device. The controller may comprise a circuitry that may be programmable using hardware modifications and/or using machine-readable instructions. Determining a dissipation of energy may comprise an evaluation of control commands used for driving the actuator and/or may comprise an evaluation of the movement itself.

According to an example, a method for operating a printer comprises moving a moveable functional element and charging a chargeable energy-storing device using energy discharged from the movable functional element during its movement.

Figure 1:
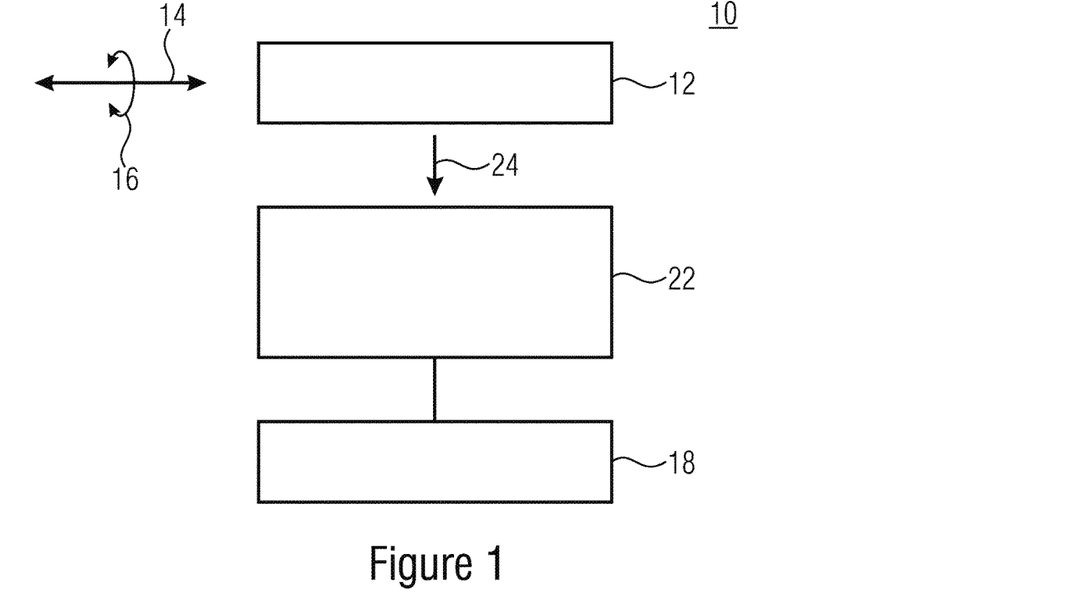
FIG. 1 is a schematic block diagram of a printer according to an example.

Referring now to FIG. 1 there is shown a schematic block diagram of a printer 10 according to an example. The printer 10 may comprise a movable functional element 12 which may be any component being controlled so as to at least temporarily move during operation. Non-limiting examples for such a movable functional element 12 may be a printer carriage, a printer roller or printer cylinder, a valve to depressurize a volume or a fluid that is depressurized, a ventilation module such as a blower or a fan and a scanner head. Movable functional elements such as a printer carriage or a printing cylinder as well as a ventilation module or a scanner head may accumulate an amount of kinetic energy when being moved. By decelerating the movable functional element 12 energy may be discharged from the movable functional element, e.g., kinetic energy. This may also refer to the example of a depressurized volume. For depressurizing a volume, a valve may be used. During depressurizing of the volume, a fluid may be moved outside a volume so as to reduce a pressure inside the volume. The moving fluid may be used for moving another component which may be used as energy generator, for example, a fan or a blower. According to another example, the fluid leaking through the valve may actuate the valve such that the discharged energy may be captured by the valve. The movable functional element may be movable along one, two or three linear directions 14 and/or may be rotatable along one, two or three rotational directions 16.

The printer 10 may comprise a chargeable energy-storing device 18. The chargeable energy-storing device 18 may allow to charge and store electrical energy. According to an example, the chargeable energy-storing device may be or may comprise a battery, i.e. an accumulator, a capacitor and/or a coil or a combination thereof. According to further examples, the chargeable energy-storing device may store mechanical energy such as a pressure or the like. For such purpose, hydraulic and/or pneumatic elements may be used.

The printer 10 may comprise a charger 22 for charging the chargeable energy-storing device 18 using energy 24 discharged from the movable functional element 12. According to an example, the charger 22 may use kinetic energy of the movable functional element 12 to charge the chargeable energy-storing device 18. By way of example, the charger may convert kinetic energy to a pressure in a hydraulic or pneumatic volume so as to charge the chargeable energy-storing device 18. According to other examples, the charger may convert kinetic energy to electrical energy and/or may supply electrical energy to the chargeable energy-storing device 18 so as to store electrical energy therein.

In one example the printer 10 may perform energy recuperation of the kinetic energy of the movable functional element 12 so as to charge the chargeable energy-storing device 18. Energy recuperation may comprise a conversion of kinetic energy of the movable functional element 12 into electrical energy, thereby decelerating the movable functional element. Thus, instead of breaking the movable functional element, e.g., by feeding or introducing additional energy to counteract the movement, energy may be drawn from the movable functional element. I.e., energy discharged from the movable functional element such a decreasing kinetic energy may be used for charging the chargeable energy-storing device.

Figure 2:
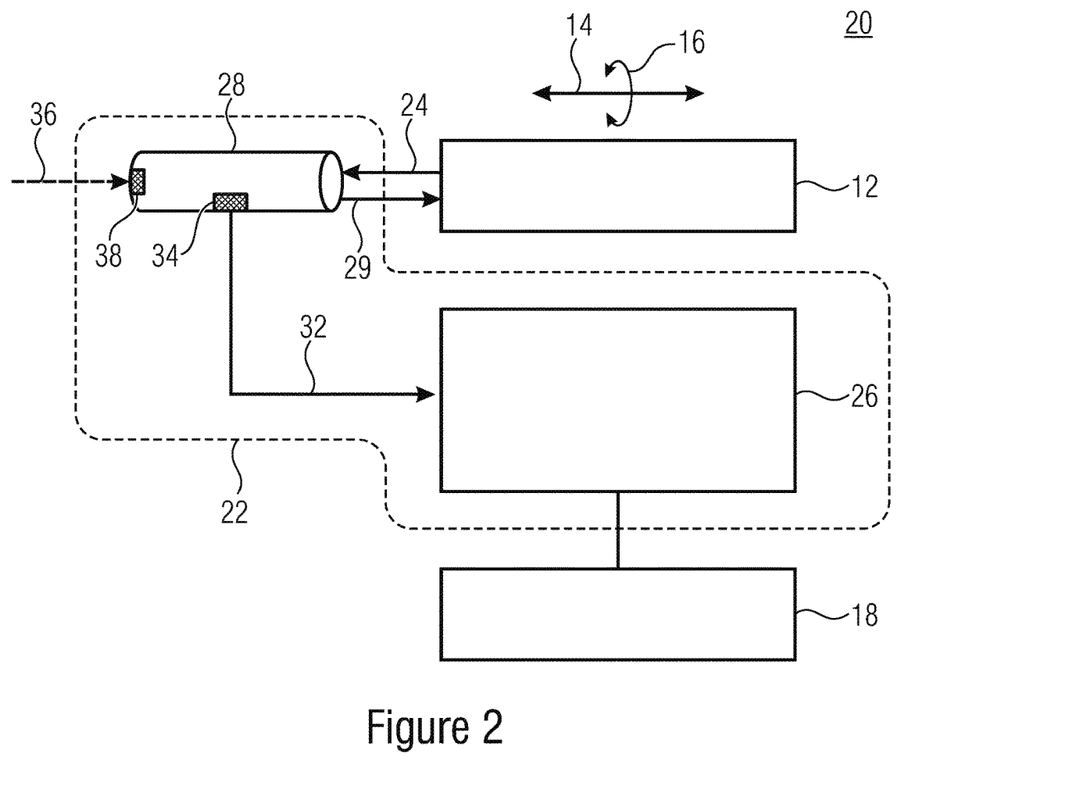
FIG. 2 is a schematic block diagram of a printer according to an example, comprising a charging device.

Referring now to FIG. 2 there is shown a schematic block diagram of a printer 20 according to an example. The charger 22 may comprise a charging device 26. The printer 20 may comprise an actuator 28 which may be a part of the charger 22 or may be a separate element or component. The actuator 28 may be connected to the movable functional element 12 for moving (e.g., accelerating and/or decelerating) the movable functional element 12. For example, the actuator 28 may increase a kinetic energy of the movable element 12 by providing mechanical energy and may discharge kinetic energy, e.g., receive the energy 24 discharged from the movable functional element 12. The charger may use electrical energy converted from at least a part of the extracted or discharged kinetic energy to charge the chargeable energy-storing device 18. For example, a degree, portion or share of the kinetic energy which is converted and used to charge the chargeable energy-storing device 18 may be varied and/or may comprise an amount of electrical losses.

The charging device 26 may provide electrical energy to the chargeable energy-storing device so as to charge the chargeable energy-storing device. The electrical energy may be received from an element that receives the discharged energy from the moveable functional element 12, e.g., from the actuator 28. According to one example, the charging device 26 may be or may comprise an interface connectable to the chargeable energy-storing device 18. According to one example, the charging device 26 may comprise electronics, such as a controller for controlling an amount and/or a course of electrical energy provided to the chargeable energy-storing device.

The actuator 28 may extract kinetic energy from the moving movable functional element and may provide the mechanical extracted energy for further use. According to an example, the actuator 28 may convert the extracted kinetic energy into electrical energy and may provide the converted electrical energy 32 to the charging device 26 and/or the chargeable energy-storing device 18.

According to an example, the charging device 26 may be a part of the actuator 28 and/or may be connected to an output terminal 34 of the actuator 28. The actuator 28 may receive external power 36 at an input terminal 38 of the actuator 28. The input terminal 38 may be disjoint or different from the output terminal 34. The actuator 28 may comprise an internal logic and/or an internal circuitry for converting the external power 36 into the mechanical energy 29 and/or for converting the energy 24 to the converted electrical energy 32.

Figure 3:
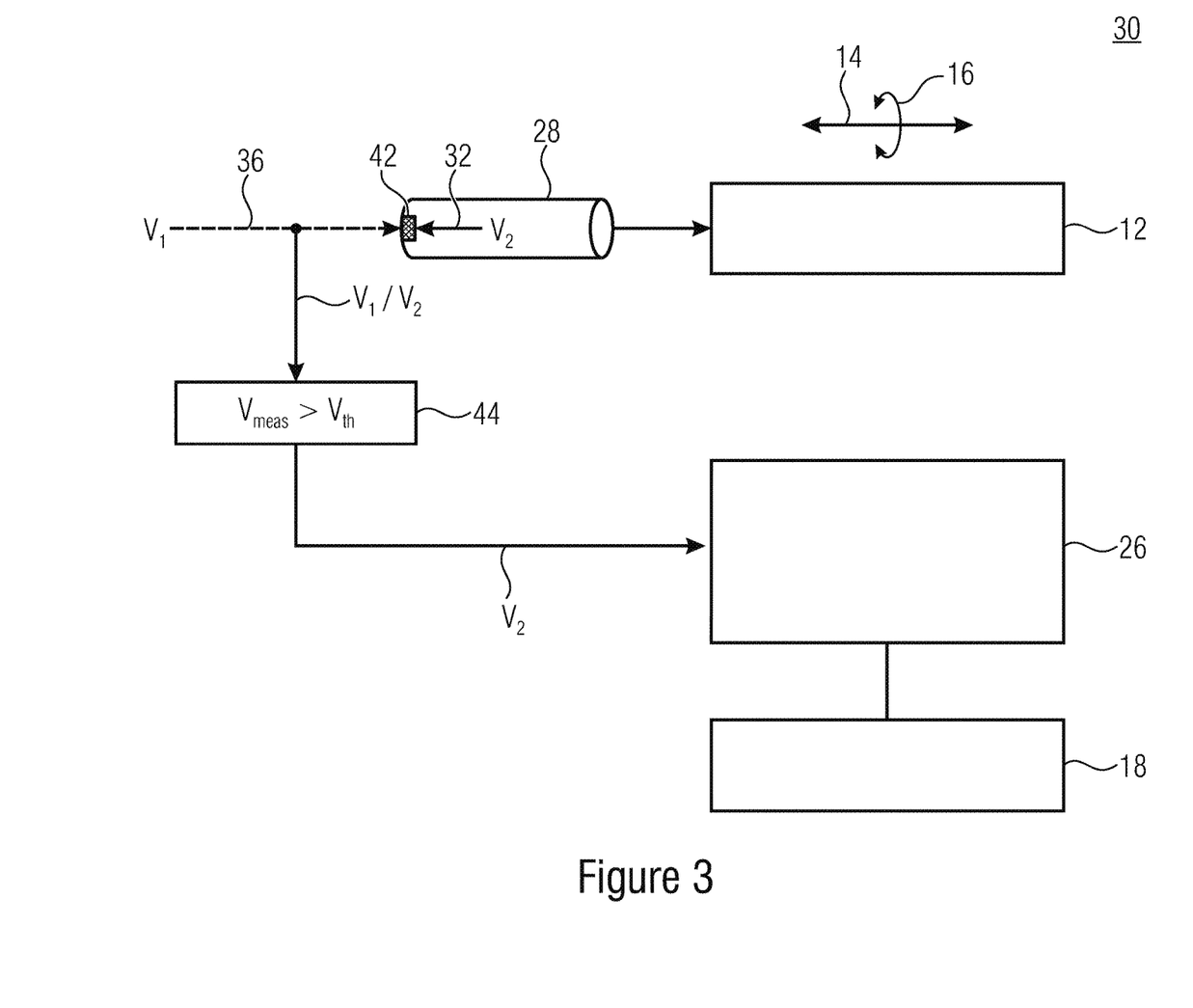
FIG. 3 is a schematic block diagram of a printer according to an example, comprising an actuator with a common terminal for receiving external power and for supplying converted electrical energy.

Referring now to FIG. 3, there is shown a schematic block diagram of a printer 30 being modified when compared to the printer 20 of FIG. 2. The actuator 28 may comprise a common terminal 42 for receiving the external power 36 and for supplying the converted electrical energy 32, for example, on the same lines that receive the external power 36. The external power 36 and the converted electrical energy may be different from each other, for example with respect to their voltage level. According to an example the external power 36 comprises a first voltage level $V_1$, wherein the converted electrical energy 32 comprises a second voltage level $V_2$. Therefore, during operation of the printer 30 different voltage levels $V_1$ or $V_2$ may be present on the lines connecting the common terminal 42. The different voltage levels may indicate a supply or discharge of energy to or from the moveable element 12.

The printer 30 may comprise a decider 44 for evaluating a voltage level $V_{meas}$ measured at an input side of the decider 44. The voltage level $V_{meas}$ may be, for example, $V_1$ indicating a supply operation of the actuator or $V_2$ indicating a presence of energy discharged from the movable functional element 12. The printer may charge the chargeable energy-storing device 18 when the voltage level $V_{meas}$ at the common terminal 42, i.e., at the decider 44 is greater than a voltage threshold level $V_{th}$. The threshold value $V_{th}$ may be any value greater than $V_1$ and at most $V_2$. For example, the supply voltage 36 of the actuator 28 may be 32V. According to other examples, the voltage may have a different voltage level, for example, 12 V, 24 V, 42 V, 48 V or any other suitable value. The voltage level $V_2$ being generated using the energy discharged from the movable functional element 12 may be greater when compared to $V_1$ by at least 1 V, at least 2 V or at least 5 V. The decider 44 may provide energy to the charging device 26 in cases where the following determination rule is fulfilled:

$$V_{meas} \geq V_{th} \text{ with } V_1 > V_{th} \geq V_2$$

being equal to $$V_{meas} > V_{th} \text{ with } V_1 \geq V_{th} \geq V_2$$

for example, $$V_{meas} > V_1.$$

I.e., the decider 44 may be a controller sensing and/or determining when wasting energy occurs, i.e., when an energy recovery is performed, for example by evaluating the voltage level.

For example, the decider 44 may comprise a processor, a field programmable gate array (FPGA) and/or a microcontroller for evaluating voltage levels and to connect the common terminal 42 of the actuator 28 with the charging device 26 during time instances fulfilling the above-mentioned criteria. Differently or in addition, the decider 44 may comprise a passive logic such as a diode having a breakthrough voltage being set in the range of the threshold voltage $V_{th}$ such that the diode blocks the voltage level $V_1$ and conducts the voltage level $V_2$.

According to other examples the decider 44 may be implemented differently, for example, for cases where the voltage level $V_2$ is smaller than the voltage level $V_1$. In such cases the decider 44 may be implemented to connect the lower voltage level $V_2$ with the charging device 26 while blocking the higher voltage level $V_1$. This may be interpreted as a printer being implemented so as to charge the chargeable energy-storing device 18 when the voltage level $V_2$ is smaller than a voltage-threshold level. As may be seen from FIG. 3, the external power supply may be connected in parallel to the charging device 26, the charger respectively, with respect to the actuator 28.

In the following, reference will be made to the actuator 28. The actuator 28 may be a motor having a counter-electromotive force (CEMF). The actuator 28 may convert a movement of the movable functional element 12 to the electrical energy 32 when decelerating the movable functional element 12 was extracting kinetic energy from the movable functional element 12. The counter EMF or CEMF may also be referred to as back electromotive force and may refer to a voltage or an electromotive force which pushes against the current which induces it. For example, in a motor using a rotating amateur in the presence of a magnetic flux, the conductions cut the magnetic field lines as they rotate. This produces a voltage in the coil. The motor may act like a generator using the Faraday's law of induction, wherein it may act at the same time as a motor. This voltage opposes the originally applied voltage. With a lower overall voltage across the armature, the current flowing into the motor is reduced. According to other examples, the actuator 28 may comprise different mechanisms for generating electrical energy from a movement of the movable functional element 12. An example for such a suitable element is a piezoelectric element which may be used as an actuator when applying a voltage and which may be used as a generator when receiving electronic charges that are generated in the piezoelectric crystals responsive to a deformation using a movement.

Figure 4:
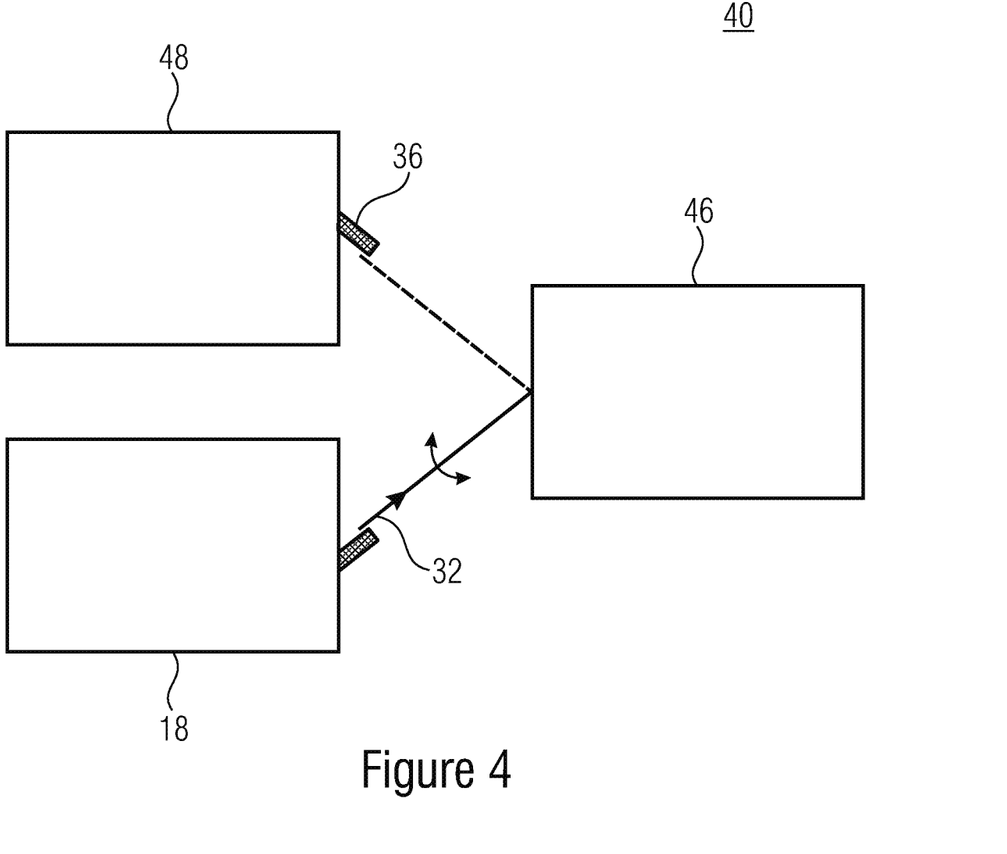
FIG. 4 is a schematic diagram illustrating parts of a printer according to an example, comprising a switch for switching between operating modes of the printer.

When referring now to FIG. 4, there is shown a schematic diagram illustrating parts of a printer 40, comprising a switch for switching between operating modes of the printer 40. Although not illustrated, the printer 40 may use energy discharged from a movable functional element for charging the chargeable energy-storing device 18 as described in connection with FIGS. 1, 2 and 3. According to an example, the printer 40 may operate in one of a plurality of operating modes. One operating mode being referred to as "Printing". During this operating mode, a printing fluid such as an ink or toner may be deposited or spitted on a certain media and/or a scanning or copying operation may be performed. In this operating mode some or even most of the determining mechanical and electrical actions may occur. During this operating mode, a power consumption of the printer may be comparatively high.

During a further operating mode that may be referred to as "Ready", the printer may be prepared for printing but may actually be in a steady state without printing. Some or even a majority of the mechanical and electrical subsystems may be unactuated, wherein some others may still be active or idling. A power consumption of the printer in this operating mode may be lower when compared to the printing operating mode but may still remain higher than other operating modes discussed herein.

In a further operating mode which may be referred to as a "Sleep Mode", the printer may show a minimum of activity. For example, this minimum activity may be just enough to allow the printer to switch to the ready mode and/or the print mode in a suitable amount of time or a minimum of time, for example, when a plot or an image to be printed is received. During this sleep mode some or even most of the determining mechanical and electrical subsystems are off, for example, including the front panel. The power consumption may be low compared to the Printing or Ready modes.

By use of examples described herein, a power consumption during the sleep mode may thereby even be zero when referring to an amount of external power used during the sleep mode. In FIG. 4, the chargeable energy-storing device 18 may provide for the converted electrical energy 32 stored therein during respective time intervals, for example, during the sleep mode. The converted electrical energy 32 may be delivered to electrical components 46 of the printer which are or remain powered during the sleep mode. The components 46 may comprise the minimum electronic components to keep the printer 60 alive. Examples for such electrical components may be, for example, controllers, sensors or input interfaces for switching the printer in the ready mode and/or the printing mode. The printer may comprise a power interface 48 for providing the external power 36. During the printing mode and/or the ready mode, the printer may be connected to the power supply interface 48 for receiving the external power 36. During this operation, the chargeable energy-storing device 18 may be charged using the discharged energy. When going into the sleep mode, power may be consumed from the chargeable energy-storing device 18 while partially or completely avoiding consuming power from the power supply interface 48. Thus, in the sleep mode, in which the movable functional element 12 remains unmoved, the printer may operate independently from power of the external power supply 48 using electrical energy stored in the chargeable energy-storing device 18.

Figure 5:
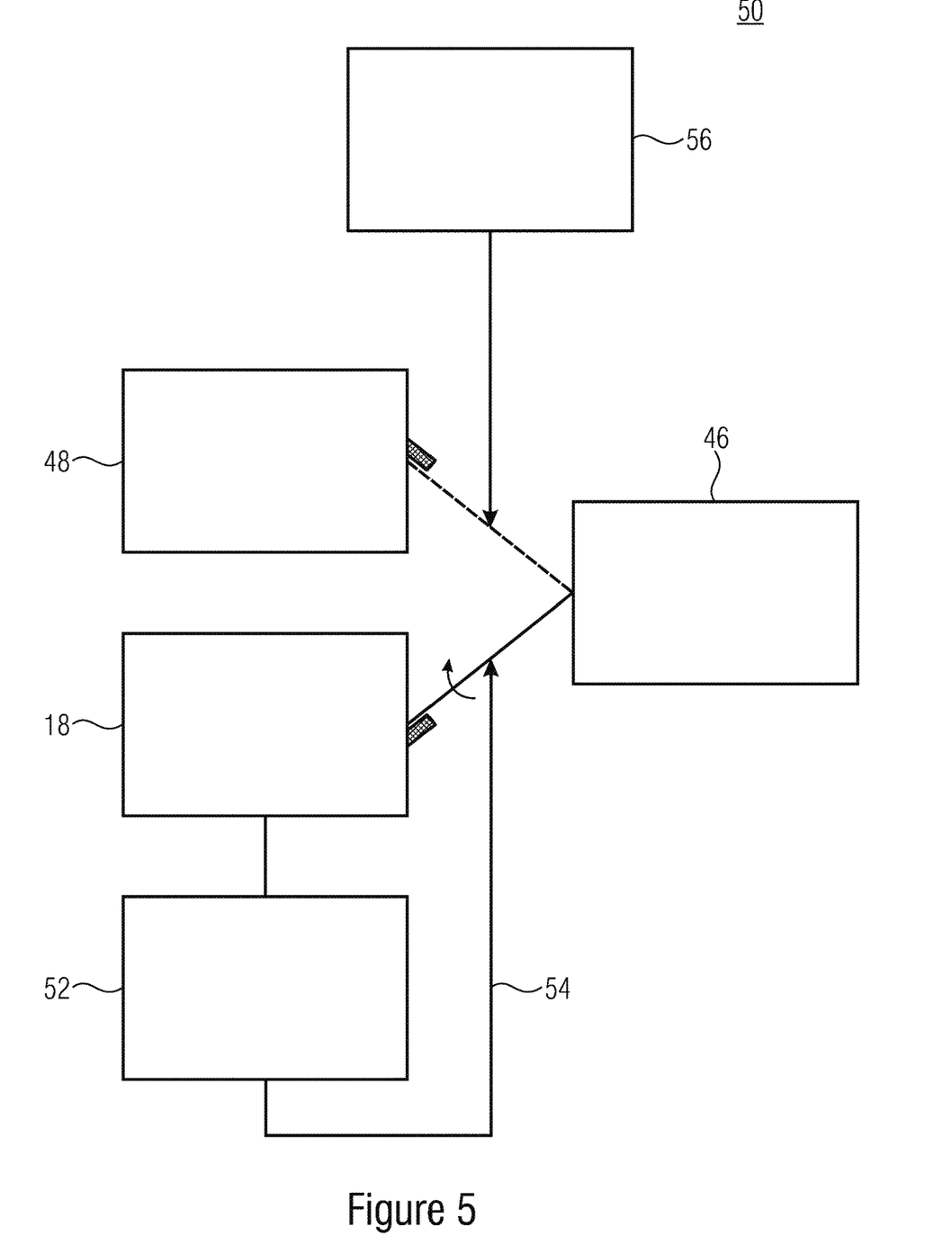
FIG. 5 is a schematic block diagram of parts of a printer according to an example, comprising a watchdog component for evaluating a level of charge of the chargeable energy-storing device.

When referring now to FIG. 5 there is shown a schematic block diagram of parts of a printer 50. The printer 50 may be modified when compared to the printer 40 of FIG. 4. The printer 50 may comprise a watchdog component 52 for evaluating a level of charge of the chargeable energy-storing device 18. For example, the level of charge of the chargeable energy-storing device 18 may be evaluated by the watchdog component 52 by monitoring a voltage level output by the chargeable energy-storing device 18. The watchdog component 52 may output a signal 54 when the level of charge is equal or below a threshold value. The threshold value may indicate that the chargeable energy-storing device 18 is empty or almost empty. According to an example, this may correlate to a level of charge being 50% or lower, 30% or lower, 10% or lower or even 5% or lower. The printer may use the external power supply 48 responsive to the signal 54. Thus, responsive to the signal 54, the printer 50 may switch to the external power supply 48 so as to avoid an unwanted shutdown. The printer 50 may comprise a switching controller for receiving the signal 54 and for switching back to the external power supply. Such a controller may be a part of the watchdog component 52.

According to an example that may be implemented independently or in combination with other examples, the printer 50 or a different printer may comprise a detector 56 for detecting an entry of the printer 50 into the sleep mode. The detector 56 may switch the power supply of the electrical components 46 from the external power supply 48 to the chargeable energy-storing device 18 responsive to the entry. The entry into the sleep mode may be detected by a respective signal which may be received from a controller of the printer 50. According to other examples, such a signal may be received from an input terminal receiving a user input. The detector 56 may be a controller for detecting the switch of the operating mode. The detector 56 may furthermore be used so as to identify a switch of the operating modes and to switch from the auxiliary power supply to the chargeable energy-storing device, for example, when the printer is put into a sleep mode.

Figure 6:
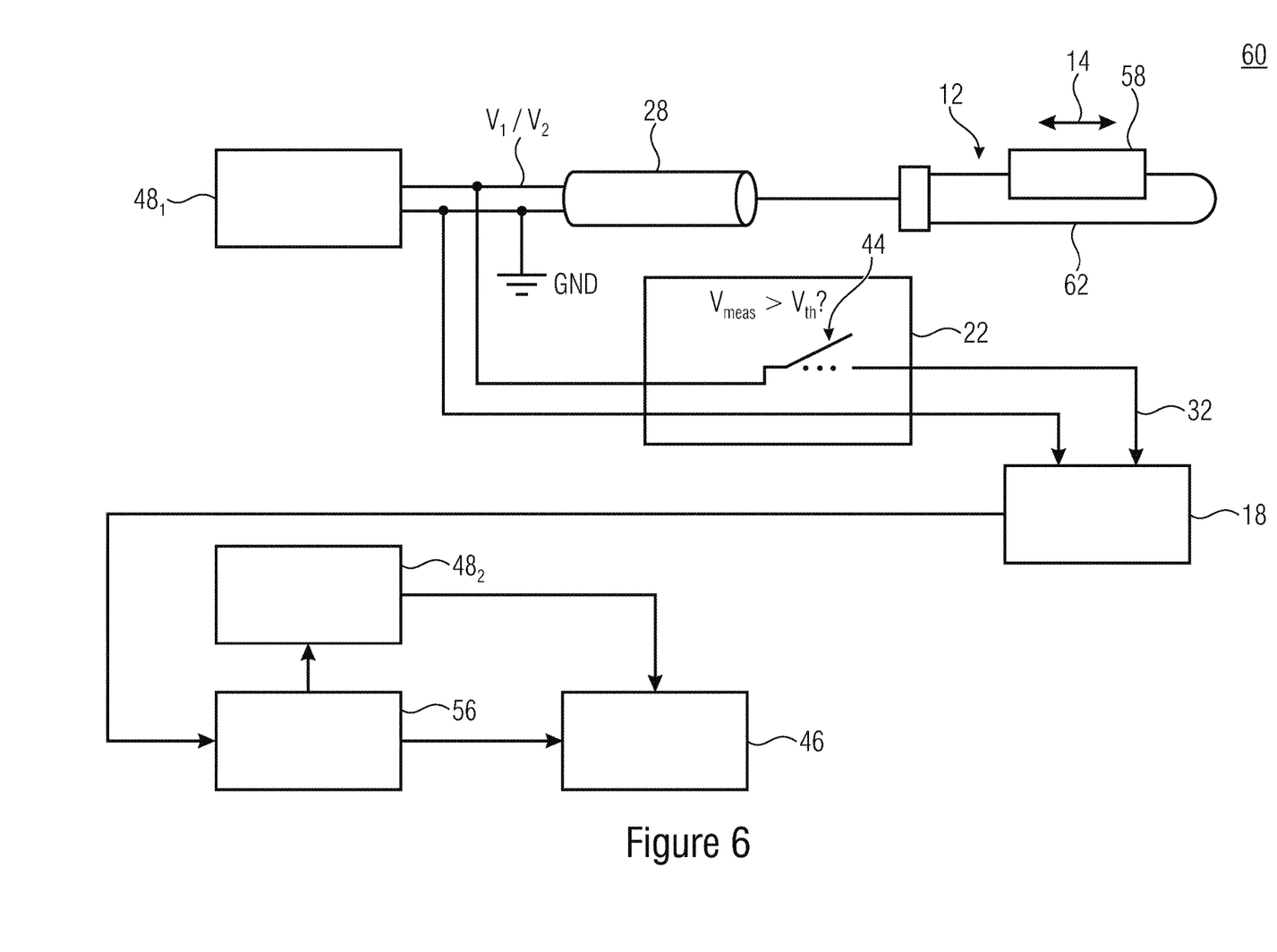
FIG. 6 is a schematic block diagram of a printer according to an example, comprising a movable functional element having a carriage being movable along a linear direction.

Referring now to FIG. 6, there is shown a schematic block diagram of a printer 60 comprising the movable functional element 12 having a carriage 58 being movable along a linear direction 14. For generating the movement along the direction 14, the actuator 28 may be arranged. The actuator 28 may be supplied by a power supply $48_1$ providing the voltage level $V_1$. For simplicity also a reference line that may carry a reference voltage such as ground (GND) is illustrated. The actuator 28 may push and/or pull the carriage 58 while moving a belt 62 being connected to the carriage 58. The decider 44 may be connected to the power lines of the power supply interface $48_1$ so as to determine if the actuator 28 outputs the converted electrical energy 32, for example, using a discrimination between the voltage levels $V_1$ and $V_2$. The decider 44 may decide to forward electrical energy received from the actuator 28 to the chargeable energy-storing device 18, for example, when $V_{meas}>V_{th}$ is fulfilled.

Using the converted electrical energy 32, the chargeable energy-storing device 18 may be charged. The detector 56 may select an external power supply $48_2$ or the chargeable energy-storing device 18 as a supply for the electrical components 46 which may be electronics supplied with energy during the low power mode, i.e., the sleep mode. For example, the detector 56 may be implemented like a switch.

The external power supplies $48_1$ and $48_2$ may be a common power supply or a part thereof. In some examples, the power supplies $48_1$ and $48_2$ may be different components. According to an example, the external power supply $48_2$ may provide for a comparatively low voltage, for example, between 3.5 volt and 5 volt being suitable for supplying electronics. One or both of the external power supplies $48_1$ and $48_2$ may be connected to the power grid supplying, for example, 110 V, 240 V or 400 V. A controller of the printer 60 may determine a dissipation of energy out of the printer 60 and may control the charger to use the dissipating energy for charging the chargeable energy-storing device 18. Such a controller may be arranged in a different printer such as the printer 10, 20, 30, 40 or 50.

Figure 7:
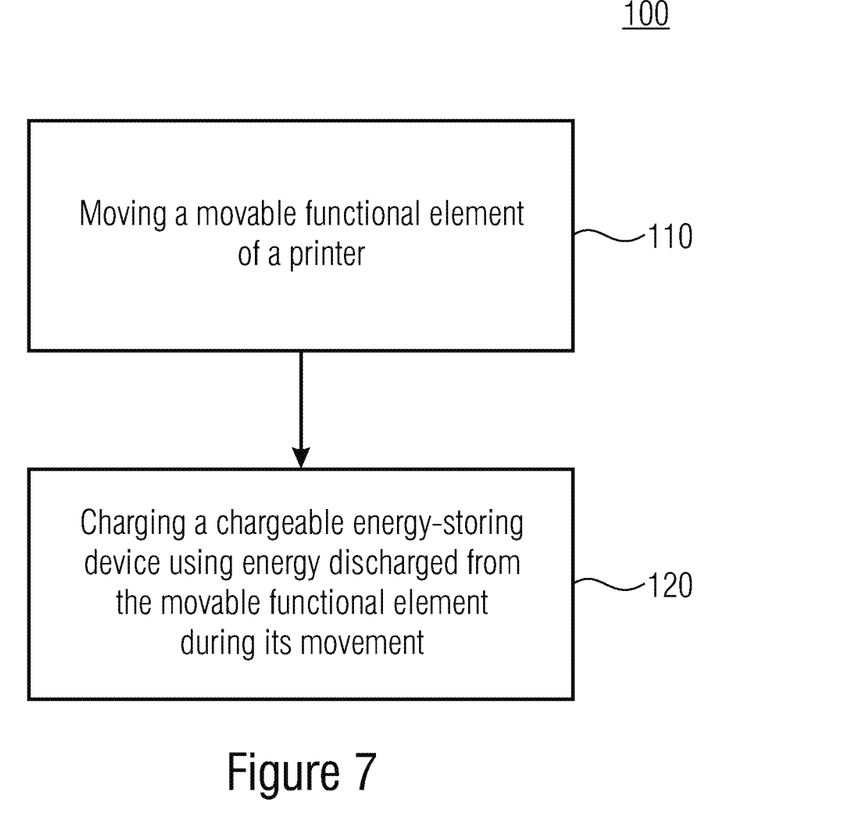
FIG. 7 is a schematic flow diagram outlining a method for operating a printer such as the printer

Referring now to FIG. 7, there is shown a schematic flow diagram outlining an example method for operating a printer such as the printer 10, 20, 30, 40, 50 or 60.

In 110 a movable functional element of the printer is moved, for example, the movable functional element 12.

In 120 a chargeable energy-storing device is charged using energy discharged from the movable functional element during its movement.

During the low power consumption mode, i.e., the sleep mode, printers such as large format printers may keep small, low-consumption subsystems active, such that the energy consumption of the printer is low or reduced. An energy budget in the sleep mode may be influenced from the type of the machine that may be in the range of, for example, somewhat, e.g., between 5 and 24 watt in low-band midrange large format printers. Examples provide a solution on how to get this energy from a different source, different from the current AC plug supply. This allows a zero W power consumption during the sleep mode, wherein the power consumption is a measure at the AC cable, i.e., the external power supply. In examples, a printing system accumulates and reuses wasted energy in the machines during its usage and supplies this energy in the sleep mode to components to be supplied. In examples, a printing system comprises a subsystem to sense when wasting energy event will occur, such as the controller mentioned in connection with FIG. 6. Furthermore, such a printing system may comprise an auxiliary battery to accumulate wasted energy such as the chargeable energy-storing device. Furthermore, a decision module may be arranged to switch between printers regular power supply unit (PSU) and the auxiliary battery, i.e., the detector 56. The PSU may comprise a transformer, an AC/DC-converter, an AC/AC-converter and/or an DC/DC converter for providing an electrical power level and/or frequency to the powered components as described in connection with the power interface.

Examples allow a printer to meet and fulfill the ENERGY STAR recommendation and may even go beyond that when consuming zero power from external power supply during the sleep mode which is more than what energy star states. Examples described therein allow preventing implementing new and more efficient power supply units (PSU) and/or may allow using existing printed circuit assemblies (PCAs) with reduced power consumption in sleep mode. The examples are not limited hereto and allow a combination with such aspects.

Printers according to examples may comprise a rechargeable battery which may be small and may be inside the printer and may be charged during normal operation of the printer. The battery may be refilled using wasted energy during some of the implemented printer movements, for example, during a carriage stop, an air system depressurization or any other actuator/motor with a comparatively large back EMF—BEMF. BEMF may refer to the voltage that may occur in electric motors where there is relative motion between the armature of the motor and the magnetic field from the motor's field magnets or windings. In a motor using a rotating armature in the presence of a magnetic flux, the conductors cut the magnetic field lines as they rotate. This may generate a voltage in the coil, i.e., the motor may act like a generator at the same time it is a motor. This voltage opposes the original applied voltage and can be dissipated and/or may be guided to the chargeable energy-storing device or battery in order to fill or refill it. I.e., the actuator may be a motor having a counter electromotive force and the charger may use energy obtained from the counter electromotive force to charge the chargeable energy-storing device. A large BEMF may thus refer to an amount of BEMF being high enough so as to harvest a sufficient amount of energy so as to fill or refill the chargeable energy-storing device during a time of, e.g., 1 day, 12 hours, 1 hour or 15 minutes. The additional electronics system may detect when these events occur. Then it may redirect the wasted energy, convert it when appropriate and store it in the battery. Another added system may detect when the printer goes to the sleep mode. When going to sleep mode, another system will actuate the auxiliary batteries supply to the printer and may temporarily deactivate the regular power supply such as an AC cable. This may allow zero consumption of power in this mode from external power supplies. Finally, a watchdog system may be arranged that may detect when the auxiliary battery is discharged and may activate back again the regular power supply. The examples allow for current specification in terms of power consumption during sleep mode that may be highly surpassed with the examples. This may be obtained due to a zero power consumption during the sleep mode. Printers according to examples allow for greener printers by recycling some of the wasted energy inside the printers. This recycling may be performed during normal operation. Future and more ambitious energy recommendations when compared to energy star, may be fulfilled.

A processing system such as a processor, a watchdog and/or a controller used in examples may represent a computing device and may be connected to a communication infrastructure, such as a bus or a network, for communicating with other components of the processing system. The processing system may comprise a circuitry that may be programmable using hardware modifications and/or using machine-readable instructions. The processing system may include a main memory, e.g., a random access memory (RAM), and an additional memory, e.g., a hard disk drive and/or a removable storage drive. The additional memory may allow machine-readable instructions to be loaded into the processing system. The processing system may include a communications interface to allow machine-readable instructions and data to be transferred between the processing system and other devices, such as the decider 44. The communication may be in the form electronic, electromagnetic, optical, or other signals capable of being handled by a communications interface. The communication may use a wire or a cable, fiber optics or may be a wireless communication.

All of the features disclosed in this specification, including any accompanying claims, abstract and drawings, and/or all of the method bocks or processes so disclosed may be combined in any combination, except combinations where at least some of the features are mutually exclusive. Each feature disclosed in this specification, including any accompanying claims, abstract and drawings, may be replaced by other features serving the same, equivalent or similar purpose, unless expressly stated otherwise. Thus, unless expressly stated otherwise, each feature disclosed is one example of a generic series of equivalent or similar features.

Although some aspects have been described in the context of an apparatus, it is clear that these aspects also represent a description of the corresponding method, where a block or device corresponds to a method part or a feature of a method part. Analogously, aspects described in the context of a method part also represent a description of a corresponding block or item or feature of a corresponding apparatus.

Depending on certain implementations, examples of the disclosure may be implemented in hardware or in machine readable instructions. The implementation may be performed using a digital storage medium, for example a floppy disk, a DVD, a CD, a ROM, a PROM, an EPROM, an EEPROM or a FLASH memory, having electronically readable control signals stored thereon, which cooperate or are capable of cooperating with a programmable computer system such that the respective method is performed.

Some examples according to the disclosure comprise a data carrier having electronically readable control signals, which are capable of cooperating with a programmable computer system, such that one of the methods described herein is performed.

Generally, examples of the present disclosure may be implemented as a computer program product with a program code, the program code being implemented for performing one of the methods when the computer program product runs on a computer. The program code may for example be stored on a machine readable carrier.

Other examples comprise the computer program for performing one of the methods described herein, stored on a machine readable carrier.

In other words, an example of the inventive method is, therefore, a computer program having a program code for performing one of the methods described herein, when the computer program runs on a computer.

A further example of the inventive methods is, therefore, a non-transitory storage medium used as data carrier or a digital storage medium, or a computer-readable medium comprising, recorded thereon, the computer program for performing one of the methods described herein.

A further example of the inventive method is, therefore, a data stream or a sequence of signals representing the computer program for performing one of the methods described herein. The data stream or the sequence of signals may for example be implemented to be transferred via a data communication connection, for example via the Internet.

A further example comprises a processing means, for example a computer, or a programmable logic device, to perform one of the methods described herein.

A further example comprises a computer having installed thereon the computer program for performing one of the methods described herein.

In some examples, a programmable logic device for example a field programmable gate array may be used to perform some or all of the functionalities of the methods described herein. In some examples, a field programmable gate array may cooperate with a microprocessor in order to perform one of the methods described herein.

The above described examples are merely illustrative for the principles of the present disclosure and modifications and variations of the arrangements and the details described herein are within the scope of the description. It is the intent, therefore, to be limited only by the scope of the impending patent claims and not by the specific details presented by way of description and explanation of the examples herein.

The invention claimed is:

1. A printer comprising:
a moveable functional element;
a chargeable energy-storing device;
a charger to charge the chargeable energy-storing device using energy discharged from the movable functional element; and
an actuator connected to the moveable functional element, the actuator to actuate the moveable functional element and to increase a kinetic energy of the moveable functional element, wherein the charger is to use electrical energy converted from at least a part of the kinetic energy to charge the chargeable energy-storing device, wherein the actuator is a motor having a counter electromotive force, wherein the actuator is to convert a movement of the moveable functional element to the electrical energy when decelerating the moveable functional element.

2. The printer of claim 1, wherein the charger is to use kinetic energy of the moveable functional element to charge the chargeable energy-storing device.

3. The printer of claim 1, wherein the printer is to perform energy recuperation of a kinetic energy of the moveable functional element so as to charge the chargeable energy-storing device.

4. The printer of claim 1, wherein the moveable functional element-comprises one of a printer carriage, a valve to depressurize a volume, a ventilation module, a scanner head, and a printing cylinder.

5. The printer of claim 1, wherein the printer comprises a power interface connectable to an external power supply, wherein the printer is to temporarily operate in a sleep mode, wherein the printer is to operate independently from power of the external power supply during the sleep mode using electrical energy stored in the chargeable energy-storing device.

6. The printer of claim 5, further comprising a watchdog component to evaluate a level of charge of the chargeable energy-storing device and to output a signal when the level of charge is equal or below a threshold value, wherein the printer is to use the external power supply responsive to the signal.

7. The printer of claim 5, wherein the printer comprises a detector to detect an entry of the printer into the sleep mode and to switch the power supply from the external power supply to the chargeable energy-storing device responsive to the entry.

8. The printer of claim 5, wherein a voltage threshold level is equal to a voltage level used to drive the actuator.

9. The printer of claim 5, wherein the external power supply is connected in parallel to the charger with respect to the actuator.

10. The printer of claim 1, further comprising:
a controller to determine a dissipation of energy out of the printer and control the charger to use the dissipating energy to charge the chargeable energy-storing device.

11. The printer of claim 1, wherein the chargeable energy-storing device comprises one of an accumulator or a capacitor.

12. A printer comprising:
a moveable functional element;
a chargeable energy-storing device; and
a charger to charge the chargeable energy-storing device using energy discharged from the moveable functional element, wherein the printer comprises an external power supply interface and an actuator to move the movable functional element, the actuator connected to the external power supply, wherein the charger comprises a charging device connected to the actuator to receive the energy discharged from the movable functional element, wherein the printer further comprises a decider to evaluate a voltage level of the energy discharged from the movable functional element; wherein the printer is to charge the chargeable energy-storing device when the voltage level is greater than a voltage threshold level, wherein the voltage threshold level is equal to a voltage level used to drive the actuator.

13. The printer of claim 12, further comprising a watchdog component to evaluate a level of charge of the chargeable energy-storing device and to output a signal when the level of charge is equal to or below a threshold value, wherein the printer is to use the external power supply responsive to the signal.

14. The printer of claim 12, wherein the printer comprises a detector to detect an entry of the printer into the sleep mode and to switch the power supply from the external power supply to the chargeable energy-storing device responsive to the entry.

15. The printer of claim 12, wherein the external power supply is connected in parallel to the charger with respect to the actuator.

* * * * *